United States Patent Office 3,301,881
Patented Jan. 31, 1967

---

3,301,881
PROCESS OF PHOSPHATIDE PREPARATION
Paul F. Davis, Addison, Ill., assignor to Central Soya Company, Inc., Fort Wayne, Ind., a corporation of Indiana
No Drawing. Filed May 31, 1963, Ser. No. 284,351
13 Claims. (Cl. 260—403)

This invention relates to a novel process for the preparation of a phosphatide and also to the product resulting therefrom, and, more particularly, to acylated neutralized phosphatides.

The phosphatides with which this invention is concerned are available commercially from vegetable sources and are commonly referred to as "lecithins." It is in this sense that the term "lecithin" is used hereinafter, rather than in its restrictive scientific meaning, phosphatidyl choline.

An important object of the invention is to provide a procedure and the resultant product wherein the fluidity of lecithin is advantageously controlled. Control of the fluidity of a phosphatide is of considerable practical importance since various pieces of processing equipment in the use of phosphatides require specific fluidities for optimum operation. Lecithin, according to the invention, can be provided in various degrees of fluidity, ranging from the "plastic" state to the free-flowing state. An objective definition of "fluidity" has been established by the National Soybean Processors Association wherein a device known as a Penetrometer is employed, and a reading of 22 millimeters prescribed as the maximum penetration consistent with "plastic" lecithin.

Historically, certain markets have required specific fluidities or plasticities, as the case may be, and the provision of a lecithin meeting these peculiar characteristics constitutes another important objective of the invention. Notable among these historical requirements is that of the European market, where a distinct preference has existed for plastic lecithin. In Europe, fluid lecithin has been associated with the presence of free fatty acids which have been considered to detract from the flavor stability and increase the possibility of end product deterioration. It has been recognized that natural grades of lecithin vary in consistency from fluid to plastic, depending upon compositional factors. In particular, lecithin from a particular source, i.e., the soybean, may vary from lot to lot, season to season, or year to year, because of these compositional changes which are not completely understood. In the past, it was deemed necessary to control the fluidity through the addition of fatty acids, which necessarily increased the lecithin acidity.

The acidity of natural grades of lecithin, as measured by pH and acid value determinations (the latter being the American Oil Chemists' Society official method, Ja. 6–55), also varies, depending upon compositional factors. Hence, a further object of the invention is to provide a process by which the acidity of lecithin can be controlled. For example, by use of the present invention, a fluid-consistency lecithin can be prepare dhaving an acid value of less than 20 mg. potassium hydroxide per gram. This compares with an acid value of 28–32, which is normally specified for fluid lecithin.

Two other important characteristics of lecithin are controlled as a consequence of controlling the fluidity, and hence another object of the invention is to provide a procedure which results in the advantageous control of emulsifying properties and "free" amino-nitrogen content.

The emulsifying and emulsion-stabilizing properties of lecithin have long been known and appreciated, and because of these desirable properties, lecithin is presently used in a number of different applications. Therefore, a further object of the invention is to provide a procedure and product wherein the emulsifying and emulsion-stabilizing properties of lecithin are improved and standardized. Since an important use of lecithin is as an emulsifying agent in oil-in-water emulsion systems, a more specific object is to provide a method of preparing lecithin especially suited for such use.

In the practice of the invention, the first step is to react lecithin with an organic acid anhydride under time and temperature conditions to give an acylated lecithin product wherein the "free" amino-nitrogen content is substantially reduced. The "free" or unreacted amino-nitrogen is determined by Formol titration, using procedures similar to those found applicable to amino acid and protein analysis. Directly following treatment with an acid anhydride, the lecithin product is treated with an aqueous solution or suspension of a base, or a basic salt, to give a lecithin product which has a pH of greater than about 6.5 when the lecithin is vacuum-dried and steam deodorized. For convenience, pH is measured on a 1% emulsion of lecithin in 30% aqueous ethanol.

A wide variety of phosphatide materials can be acylated and neutralized according to the invention. However, because of its wide availability and use, commercial soybean lecithin is the preferred base stock for acylation and neutralization. This lecithin may be used as it is removed from soybean oil in the emulsion form containing about 15% to 50% water, or "dry" commercial natural-grade lecithin containing about 1% or less water may be used. These natural grades of lecithin normally contain about 60–70% A.I. (acetone insoluble) material on a dry or moisture-free basis, the acetone soluble fraction consisting primarily of soybean oil. Alternately, the base stock may be oil-free phosphatides prepared by removing soybean oil from natural soy lecithin through the use of appropriate solvents, such as acetone. The oil-free phosphatides may be extracted with alcohol to give alcohol-soluble and alcohol-insoluble phosphatide fractions which may be acylated and neutralized. The phosphatides may be dissolved in edible oil carriers (e.g., cottonseed oil, margarine oil, etc.) or other carriers before treatment. The phosphatide compositions may be bleached before, during, or after acylation and neutralization with oxidizing agents such as hydrogen peroxide and benzoyl peroxide. However, bleaching is normally performed before acylation to inhibit darkening of the phosphatides during processing and to allow a longer time for effective bleach action. Thus, the starting material is a lipid material consisting predominantly of phosphatidic materials—as such, or in the form of aqueous emulsions. The phosphatides present in the starting material normally are above 53% (moisture-free basis) and usually in the range of 60–80%, which results in a product which will not separate into various phases.

While phosphatide materials from soybeans are the preferred base stock for preparation of acylated, neutralized products, phosphatides from other sources such as peanut, corn, and sesame can advantageously be used.

A variety of organic acid anhydrides can be advantageously employed in the practice of the invention. These include acetic anhydride, succinic anhydride, maleic anhydride, diacetyltartaric anhydride and phthalic anhydride. Because of the ready availability, I prefer to use acid anhydrides wherein the number of carbon atoms present is not more than 10, excluding any aryl radical.

The acylated lecithin may be neutralized with a number of bases or basic salts to increase the pH. For edible purposes, sodium hydroxide, sodium bicarbonate, ammonia, and calcium hydroxide are suitable basic additives. Other bases may be used (e.g., potassium hydroxide, magnesium hydroxide), but may not be desirable from an economic standpoint. For non-edible applications, bases such as organic amines, i.e., triethanolamine, may advantageously be used.

Acid anhydride-reacted phosphatide neutralized with monobasic cations to a pH of about 7.0–7.5 are, in general, more fluid than the phosphatides from which they are prepared, are more easily dispersed in aqueous media, and the emulsions produced are more stable. The use of bases with monovalent cations for neutralization to the indicated pH range accentuates the oil-in-water emulsifying character of natural phosphatides and increases their tolerance to mineral matter in the aqueous phase.

The use of bases with divalent cations to neutralize dibasic acid anhydride-reacted phosphatides gives products having somewhat different characteristics. In the pH range of interest (pH=7.0–7.5), these products are more fluid than those prepared containing added monobasic cation. Emulsions prepared containing acid anhydride-reacted phosphatides neutralized with bases of divalent cations have the characteristics of water-in-oil emulsions, i.e., they are viscous, semi-creamy fluids or gels. The oxidative stability of the neutralized products is superior to that found in the unneutralized products and give emulsifiers much more suitable for use in food applications.

Specific examples of the practice of the invention are set down below:

EXAMPLE I

To 264 g. of natural soy lecithin emulsion containing 24.3% water (200 g. lecithin dry basis) at 56° C. was added 6.0 ml. of acetic anhydride. Following agitation for 30 minutes at 55–56° C., 3.3 ml. of 30% sodium hydroxide solution (0.5% based on dry lecithin weight) were added and mixing continued for 5 minutes. Vacuum was applied and adjusted to 24 to 25 inches mercury and the temperature increased to 70° C. using low pressure steam for heating. The pressure was reduced to 23 mm. mercury absolute and the temperature increased to 90° C. To remove residual acetic acid, 40 ml. of distilled water (20%) was added dropwise while agitating at 90–92° C. and under 23 to 24 mm. mercury absolute pressure. The change in lecithin analysis is shown in Table I, wherein the "control" lecithin was prepared by vacuum drying a portion of the untreated lecithin emulsion.

The calcium hydroxide-neutralized lecithin product is a viscous fluid in consistency, and on dilution with degummed soybean oil to 65% acetone insolubles content has acceptable fluidity properties for handling purposes. Thus, a fluid lecithin product can be prepared without the use of fatty acids. The normal acid value for lecithin fluidized with fatty acids is 28 to 32 mg. of potassium hydroxide/gram.

In margarine, the use of 0.3% of emulsifiers such as provided in this example as anti-spatter agents consistently give better results (less spatter and less frothing during frying) than the use of 0.3% natural phosphatides.

In dispersion of calf milk replacer rations, a more uniform and stable suspension results when anhydride-reacted, neutralized phosphatides are used as a replacement for natural phosphatides. Sodium and potassium salts of anhydride-reacted phosphatides give more stable foams than those formed using natural phosphatides, and their use is also indicated in soaps and detergents as a "superfatting" agent.

Example III

A portion of the lecithin emulsion used in Examples I and II was vacuum dried to about 0.1% moisture. While maintaining the temperature as 54° C., 3% of acetic anhydride was added and mixed for 30 minutes under 24 to 25 inches mercury vacuum to minimize incorporation of air. Most of the acetic acid was removed by heating the acylated lecithin to 80° C. under 21 to 22 mm. mercury pressure, following which 10% of distilled water was added under the same conditions to aid in removal of acetic acid. A small sample was removed for analysis.

A 30% solution of sodium hydroxide (1% NaOH based on lecithin) was added, mixed 5 minutes at 65° C., and the water removed by vacuum drying. The analyses of the initial dry lecithin, the acetylated, and the acetylated neutralized product are given in Table II. This data illustrates that reaction of acetic anhydride with lecithin lowers the pH and Formol titration analysis of lecithin but, on removal of acetic acid, this reaction has little effect on a standard acid value analysis. Addition of a base such as sodium hydroxide raises the pH and lowers the acid value without appreciably affecting Formol titration analysis. The acetylated sample is a viscous fluid

*Table I*

| Lecithin | Percent Acetone Insolubles | Percent Moisture | Percent Acetone Solubles | Percent Petr. Ether Insolubles | Acid Value, mg. KOH/g. | pH of 1% Emulsion | Formol Titration, mg. NH₂N/g. |
|---|---|---|---|---|---|---|---|
| Control | 72.4 | 0.1 | 27.5 | 0.11 | 25.5 | 7.50 | 2.53 |
| 3% Acetic Anhydride and 0.5% NaOH | 71.7 | 0.1 | 28.2 | 0.44 | 18.6 | 6.85 | 0.98 |

The acid value lowering of 6.9 units (from 25.5 to 18.6) compares well with the 7.0 unit lowering predicted in consistency, while the control and the acetylated, sodium hydroxide neutralized samples are plastic.

*Table II*

| Lecithin | Percent Acetone Insolubles | Percent Moisture | Percent Acetone Solubles | Percent Petr. Ether Insolubles | Acid Value, mg. KOH/g. | pH of 1% Emulsion | Formol Titration, mg. NH₂N/g. |
|---|---|---|---|---|---|---|---|
| Control | 72.4 | 0.1 | 27.5 | 0.11 | 25.5 | 7.50 | 2.53 |
| 3% Acetic Anhydride | | | | | 27.2 | 4.31 | 0.64 |
| 3% Acetic Anhydride and 1.0% NaOH | 71.6 | 0.3 | 28.1 | 0.21 | 11.1 | 8.00 | 0.43 | for the quantity of base added. Both products are of firm-plastic consistency at 0.7 to 0.8% moisture.

EXAMPLE II

The experiment given in Example I was repeated with one exception: 1.0 g. of calcium hydroxide (0.5% based on lecithin) as a 20% aqueous slurry was added in place of sodium hydroxide. The acylated, calcium hydroxide-neutralized lecithin had an acid value of 19.5, a pH of 6.8, and Formol titration of 1.03.

A "Shake Test" employed to compare the ease of emulsion formation is as follows: 1.0 g. of lecithin is dissolved in 10 g. of cottonseed salad oil in an 8 ounce clear glass bottle by heating to 70° C. and agitating. After cooling to 25° C., 90 ml. of distilled water (25° C.) is added. The phases are emulsified using one sharp "up and down" arm motion every 30 seconds. The number of shakes required to form an emulsion which is stable for at least 30 seconds is recorded. For the lecithin samples in Table II, 26 shakes were required for the control, 9 shakes for the acetylated, and 5 shakes for the acetylated-neutralized product. The oil-in-water emulsion prepared from the final sample is the most stable. The Shake Test illustrates that an improvement in the emulsifying properties of lecithin for oil-in-water emulsions is accomplished by acetylation and neutralization.

*Example IV*

This example illustrates the effect of water in reducing the extent of reaction between acetic anhydride and lecithin. Two modified lecithin products were prepared as follows: (a) a sample of lecithin emulsion containing 49.9% water was heated to 70° C., 2.9% acetic anhydride to reach the desired pH. The analyses of the above natural grade lecithin, the acetylated, and the acetylated, ammonia-neutralized lecithins are given in Table IV. Several factors are of interest: (1) ammonia raises the pH but does not lower the acid value; (2) ammonia analyzes as amino-nitrogen and thus can give misleading results; (3) the ammonia-neutralized sample is firm in consistency and in this regard functions in a manner similar to sodium hydroxide.

When these products were evaluated in a Shake Test as given in Example III, the C3PSB required 18, the acetylated 4, and the acetylated, ammonia-neutralized lecithin 2 shakes to emulsify the phases.

*Table III*

| Sample | Percent Acetone Insolubles | Percent Moisture | Percent Acetone Solubles | Percent Petr. Ether Insolubles | Acid Value, mg. KOH/g. | pH of 1% Emulsion | Formol Titration, mg. $NH_2N$/g. |
|---|---|---|---|---|---|---|---|
| Control | 69.5 | 0.8 | 29.7 | 0.04 | 24.8 | 7.00 | 2.46 |
| Emul. treat | 69.4 | 0.9 | 29.7 | 2.09 | 17.4 | 7.50 | 1.61 |
| Dry treat | 69.4 | 1.0 | 29.6 | 0.13 | 13.4 | 7.50 | 0.66 |

*Table IV*

| Lecithin | Percent Acetone Insolubles | Percent Moisture | Percent Acetone Solubles | Percent Petr. Ether Insolubles | Acid Value, mg. KOH/g. | pH of 1% Emulsion | Formol Titration, mg. $NH_2N$/g. |
|---|---|---|---|---|---|---|---|
| C3PSB | 69.8 | 0.9 | 29.3 | 0.25 | 27.9 | 6.95 | 2.04 |
| 3% Acetic Anhydride | 66.1 | 0.5 | 33.4 | 0.20 | 27.9 | 4.75 | 0.55 |
| 3% Acetic Anhydride and $NH_3$ | 68.7 | 1.3 | 30.0 | 0.32 | 27.6 | 7.20 | 2.40 | added and mixed 30 minutes, 0.8% calcium hydroxide (10% aqueous slurry) added and mixed 30 minutes and the product vacuum dried and vacuum steam deodorized at 80° C. and at 20 mm. mercury pressure absolute. (b) The lecithin emulsion was initially vacuum dried and then the treatment followed as given for sample (a). A comparison of the extent of the reaction can be made from the analyses given in Table III. The Formol analysis (a measure of "free" amino-nitrogen) indicates that about 65% of the amino-nitrogen remained unreacted when lecithin emulsion was treated, whereas only about 27% remained unreacted when the same treatment was performed on dry lecithin. Note that at the same final pH, differences in acid value and petroleum ether insolubles are found. The increase in the latter analysis is probably due to the presence of a small amount of calcium acetate. When a sample of dry lecithin was treated with 4% of acetic anhydride, almost complete reaction of amino-nitrogen was obtained, the final concentration being less than 5% of the initial concentration.

*Example V*

A commercial sample of natural-grade single bleach plastic soy lecithin was heated to 80° C. under 23 mm. mercury pressure absolute to reduce the moisture content to less than about 0.2%. 3% of acetic anhydride was added, the temperature maintained at 80° C., and the reaction mixture agitated 30 minutes while under about 24 inches mercury vacuum. Acetic acid was removed by vacuum drying and vacuum stream deodorization, at which time a sample was removed.

Ammonia gas was bubbled into the acetylated lecithin

*Example VI*

A sample of commercial unbleached plastic natural-grade lecithin was heated to 85° C. under 24 mm. mercury pressure absolute to reduce the moisture content to below about 0.2%. After cooling to 80° C., 3% of acetic anhydride was added and mixing continued 30 minutes at 80° C. and under 20 to 21 inches mercury vacuum.

Acetic acid was removed as in Example III, following which 1.82% of sodium bicarbonate (10% solution) was added and mixed and the product vacuum dried. The analyses of the C1PUB and the acetylated, sodium bicarbonate-neutralized lecithin products are given in Table V. On a molar basis, sodium bicarbonate is equivalent to sodium hydroxide as a neutralizing base for acetylated lecithin.

*Table V*

| Lecithin | Percent Acetone Insolubles | Percent Moisture | Percent Acetone Solubles | Percent Petr. Ether Insolubles | Acid Value, mg. KOH/g. | pH of 1% Emulsion | Formol Titration, mg. $NH_2N$/g. |
|---|---|---|---|---|---|---|---|
| C1PUB | 68.5 | 0.4 | 31.5 | 0.09 | 23.2 | 7.20 | 2.27 |
| 3% Acetic Anhydride and $NaHCO_3$ | 69.0 | 1.4 | 29.6 | 0.22 | 12.0 | 7.90 | 0.30 |

When tested as emulsifying and dispersing agents in a dry calf milk replacer ration containing about 12% fat, both lecithin products gave good wetting and dispersion of the powder in water. However, the fat emulsion was more stable and the solids suspended better with the acetylated, sodium bicarbonate-neutralized lecithin product. This example illustrates the improved emulsifying and emulsion stabilizing activity which can be obtained by using the products from the processes described herein.

EXAMPLE VII

To 250 g. of commercial natural-grade lecithin (C1PUB) which had been heated to 85° C. at 20 mm. mercury pressure absolute was added 7.5 g. of flake succinic anhydride (3.0%). The reaction mixture was maintained at 80–85° C. under 24 to 25 inches mercury vacuum while agitating for 30 minutes. A 30 g. sample was removed for analysis.

To the remainder was added 1.86% sodium hydroxide (as a 15% solution), mixed for 40 minutes at 82–85° C., and vacuum dried by heating to 85° C. under 20 mm. mercury pressure absolute. The products are characterized by the analyses given in Table VI. It is apparent that the reaction between succinic anhydride and lecithin is not as complete as between acetic anhydride and lecithin, and that the addition of base causes the reaction to proceed further. Other experiments have indicated that about 30 minutes reaction time gives maximum amino-nitrogen (Formol) reduction under these reaction conditions.

When used as an emulsifying and dispersing agent in a calf milk replacer ration containing 12% fat, the succinylated, neutralized sample was superior, giving a stable fat emulsion and good suspension of solids. This example illustrates the ease of preparation and the improved emulsifying properties of succinylated, sodium hydroxide neutralized lecithin.

anhydride and lecithin. The product has improved emulsifying properties for use in the preparation of aqueous insecticide dispersions.

EXAMPLE XI

To 300 g. of natural-grade lecithin (Centrol) F4S at 50° C. was added 19.5 g. (6.5%) of diacetyltartaric anhydride. After mixing 30 minutes at 50° C., 2.33% of potassium hydroxide (30% solution) was added, mixing continued for 30 minutes at 50 to 55° C., and the product dried by heating to 70° C. under 17 to 18 mm. mercury absolute pressure. The acylated, neutralized product had a pH of 7.4 and promotes the formation of oil-in-water emulsions.

EXAMPLE XII

To 2350 lbs. of lecithin emulsion containing 25% water at 55° C. (1760 lbs. dry lecithin) was added 53 lbs. of acetic anhydride. After mixing 15 minutes, 64.3 lbs. of 30% potassium hydroxide (1.1% based on lecithin) was added and mixed 15 minutes. The acetylated lecithin emulsion was vacuum dried in a thin-film continuous Table VI

| Lecithin | Percent Acetone Insolubles | Percent Moisture | Percent Acetone Solubles | Percent Petr. Ether Insolubles | Acid Value, mg. KOH/g. | pH of 1% Emulsion | Formol Titration, mg. NH$_2$N/g. |
| --- | --- | --- | --- | --- | --- | --- | --- |
| C1PUB | 68.5 | 0.4 | 31.5 | 0.09 | 23.2 | 7.5 | 2.27 |
| 3% Succinic Anhydride | | | | | 41.7 | 4.4 | 1.13 |
| 3% Succinic Anhydride and NaOH | 70.1 | 0.1 | 29.8 | 0.38 | 20.3 | 7.4 | 0.76 |

EXAMPLE VIII

The experiment in Example VII was repeated with one exception: 3.9% of sodium bicarbonate (10% solution) was added in place of the sodium hydroxide. The vacuum dried product had a pH of 7.6, an acid value of 17.0, and a Formol titration of 0.76 mg. amino-nitrogen/g. The lecithin product is of plastic consistency at 0.8% moisture and functions as well as the product from Example VII as an emulsifier for calf milk replacer rations.

EXAMPLE IX

To 150 g. of commercial natural-grade lecithin (C1PUB) which had been heated to 90° C. at 20 mm. mercury absolute pressure was added 3.81 g. of maleic anhydride (2.54%). After reacting for 30 minutes at 80° C., a 30 g. sample was removed having the following analysis: pH=3.9, acid value=40.9, Formol=2.16.

3.24% of sodium bicarbonate (10% solution) was added, mixed 30 minutes at 70 to 75° C., and the emulsion vacuum dried. The neutralized product had a pH of 8.0, an acid value of 16.2, and a Formol titration of 1.04.

The original lecithin (C1PUB) had a Formol titration of 2.42 mg. amino-nitrogen/g., which was not substantially reduced by reaction with maleic anhydride before base addition. The neutralized product has been satisfactorily reduced in amino-nitrogen content and may be used in non-edible emulsifier applications, i.e., dispersion of titanium dioxide pigments.

EXAMPLE X

The natural-grade lecithin used in Example IX was reacted with 3.84% phthalic anhydride under the same conditions used in Example IX. An unneutralized sample had a pH of 4.25, an acid value of 38.4, and a Formol titration of 1.98 mg. amino-nitrogen/g.

After neutralization with 3.24% of sodium bicarbonate (10% solution) and vacuum drying, the product had a pH of 8.25, an acid value of 7.6, and a Formol titration of 1.00. This example illustrates that base addition is necessary to obtain the desired reaction between phthalic dryer at 110° C. under 50 mm. mercury absolute pressure, following which the lecithin was cooled before packaging.

The acetylated, potassium hydroxide neutralized lecithin had a pH of 6.55. The acid value was reduced from 27.2 to 19.4 and the Formol titration from 2.55 to 0.84. The product functions as an antispatter emulsifier in margarine and promotes release of flavor components in the mouth.

From the foregoing, it can be seen that the starting material may be a lecithin emulsion, dry natural-grade lecithin, oil-free phosphatides, or fractions of commercial phosphatides. Also, the variety of acid anhydrides can be appreciated from the fact that acetic, succinic, maleic, and phthalic anhydrides were used in Examples I, VII, IX and X, respectively. The acid anhydride concentration normally is in the range 2.5–3.0%, except that in the case of phthalic anhydride, the percentage employed was 3.84, and with diacetyltartaric anhydride about 6.5. More generally, the advantageous range can be placed at 2.5–5.0% of the weight of the dry lecithin.

When the acid anhydride added to commercial natural-grade soy lecithin is acetic anhydride, the optimum concentration for reduction of amino-nitrogen is about 2.5–3.0% based on dry lecithin weight. When the acylation is conducted at about 70° C. for about 30 minutes, reduction in amino-nitrogen from the original 2.40–2.60 mg. of amino-nitrogen per gram to less than about 1.0 mg. amino-nitrogen per gram, is achieved and, in fact, reductions to less than about 0.30 mg. per gram have been accomplished.

The acylation conditions as indicated may include a time up to about 30 minutes, although substantial reaction is achieved shortly after initial mixing. The temperature of acylation is preferably in the range 54–90° C., with the pressure ranging from under 20 inches of mercury to atmosphere.

Also, as indicated, a variety of neutralizing agents may be employed, the concentration being such as to bring the pH to the range of about 6.5–8.0. The divalent cation bases, i.e., calcium hydroxide, yield more fluid lecithin products of the acylated, neutralized type, and are advantageously employed for water-in-oil emulsions, while the monobasic materials yield firmer products, i.e., through the use of such bases as sodium hydroxides, potassium hydroxides, sodium bicarbonates, and ammonia.

After neutralization, the acylated, neutralized phosphatide is dried, preferably under less than 50 mm. mercury pressure and at a temperature not higher than about 120° C. It will be appreciated, however, that where water is not formed during the reaction and the initial product is dry, the drying step may be omitted, as would be the case, for example, using a non-odorous anhydride and ammonia.

Relative to the water concentration in the final product, the normal range of 0.7–1.0% yields a fluid product with a divalent cation basic material and a plastic product with a monovalent cation basic material. However, when the water concentration is less than about 0.4% and a monobasic neutralizing material is employed, a fluid acylated neutralized lecithin results.

I have found that acylation develops a more fluid phosphatide material even in the normally plastic range of 0.7–1.0% water than the unacylated phosphatide—and this even when monovalent cation basic materials are employed.

The Formol titration is a method for determining the extent of reaction of the phosphatide with the organic acid anhydride and, in turn, is a guide to the modification of the phosphatide which results in improvements of the properties as hereinbefore given. I have found that these desirable properties are achieved with modified phosphatides whose Formol titration value is about 1.7 or less.

While in the foregoing specification a detailed description of the invention has been set down for the purpose of explanation thereof, many variations in the details herein given may be made by those skilled in the art without departing from the spirit and scope of the invention.

I claim:
1. In a method of modifying a natural phosphatide, the steps of:
   mixing a vegetable material consisting predominantly of phosphatidic material with a carboxylic acid anhydride containing not more than ten carbon atoms to acylate the amino groups of said phosphatidic material, and
   controlling the fluidity of the acylated phosphatidic material by adding thereto a basic material.
2. The method of claim 1 in which said basic material is a member selected from the class consisting of sodium hydroxide, sodium bicarbonate, potassium hydroxide, ammonia, calcium hydroxide, magnesium hydroxide, and triethanol amine.
3. The method of claim 1 in which the acylated phosphatidic material is dried under reduced pressure after the addition of said basic material thereto.
4. The method of claim 1 in which said acid anhydride is a member selected from the class consisting of acetic, succinic, maleic, diacetyltartaric and phthalic anhydrides.
5. The method of claim 4 in which said acid anhydride is acetic anhydride and in which the acetylated phosphatidic material is dried under reduced pressure subsequent to the addition of said basic material thereto.
6. In a method of producing lecithin having emulsifying properties, low acid value, and low free amino-nitrogen, the steps of:
   acylating with a carboxylic acid anhydride containing not more than ten carbon atoms the amino groups of a vegetable phosphatidic material comprising at least 50% lecithin to produce an acylated lecithin product, and
   neutralizing said acylated lecithin product to bring the pH thereof to the range of about 6.5–8.0.
7. The method of claim 6 in which the neutralized acylated lecithin is dried under reduced pressure.
8. The method of claim 7 in which the pressure is less than about 50 mm. Hg and the temperature during drying is less than about 120° C.
9. The method of claim 7 in which the dried neutralized acylated lecithin is fluid, neutralization of said acylated lecithin comprising adding a divalent cation basic material thereto.
10. The method of claim 7 in which neutralization of said acylated lecithin comprises adding a monovalent cation basic material to said acylated lecithin, said acylated lecithin having a water content in the range of 0.7–1.0% to provide a lecithin having increased fluidity over the unacylated lecithin.
11. The method of claim 7 in which neutralization of said acylated lecithin comprises adding a divalent cation basic material to said acylated lecithin, said acylated lecithin having a water content in the range of 0.7–1.0% whereby a fluid lecithin is provided in comparison to the normally plastic unacetylated lecithin having said water content.
12. In a method of modifying a natural phosphatide of superior emulsifying properties, the steps of:
   mixing a vegetable phosphatide with a carboxylic acid anhydride containing not more than ten carbon atoms to acylate the amino groups of phosphatide under conditions of time and temperature productive of a lowering of the amino-nitrogen in the phosphatide, and
   directly thereafter neutralizing the acylated phosphatide to provide a pH above about 6.5.
13. The method of claim 12 in which said mixing being carried out at a temperature less than about 90° C. and for a time of about one-half hour, with the anhydride constituting about 2.5–5.0% of the weight of the phosphatide on a dry basis,
   said neutralizing including reacting the acylated phosphatide with a member selected from the class consisting of sodium hydroxide, sodium bicarbonate, potassium hydroxide, ammonia, calcium hydroxide, magnesium hydroxide, and triethanol amine,
   the neutralized acylated phosphatide being dried at a temperature below about 120° C. and at a pressure below 50 mm. Hg absolute, the resultant dried neutralized acylated phosphatide having an acid value less than about 28 and a Formol titration value of less than about 1.7.

References Cited by the Examiner

UNITED STATES PATENTS

| | | | |
|---|---|---|---|
| 1,958,295 | 5/1934 | Christensen | 99—2 |
| 2,434,429 | 1/1948 | Nelson | 99—122 |
| 2,791,594 | 5/1957 | Hennesy et al. | 260—403 |
| 2,855,416 | 10/1958 | Hennessy et al. | 260—403 |
| 3,031,478 | 4/1962 | Klenk et al. | 260—403 |

CHARLES B. PARKER, *Primary Examiner.*

A. H. SUTTO, *Assistant Examiner.*